March 12, 1957  A. H. MAGGS  2,785,373
DYNAMO ELECTRIC MACHINES
Filed Aug. 30, 1954

INVENTOR
ARTHUR HEMBOROUGH MAGGS
BY
ATTORNEY

United States Patent Office 2,785,373
Patented Mar. 12, 1957

2,785,373

DYNAMO ELECTRIC MACHINES

Arthur Hemborough Maggs, Rugby, England, assignor to The British Thomson-Houston Company Limited, a British company Application August 30, 1954, Serial No. 453,013

Claims priority, application Great Britain September 3, 1953

2 Claims. (Cl. 322—66)

This invention relates to self-excited synchronous dynamo-electric machines.

In the type of self-excited synchronous alternating current machine in which the armature rotates in a stationary field system and carries a main alternating current winding connected to slip rings from which the output current is obtained, and a smaller winding connected to a commutator from which direct current for energising the field system is obtained, the machine itself is often used in lieu of a separate starting motor for starting a prime mover which subsequently drives it, by supplying the direct current circuit from a battery. It is also usual to provide the machine with an additional series field winding, the purpose of which is to strengthen the flux and consequently the torque exerted during the period of starting.

In the case of machines of the character above described the torque they exert is considerably less than the optimum for a given current taken from the battery. This is because the axes of the D. C. armature winding and of the magnetic flux respectively are not in the optimum space phase relationship one with the other.

The object of the present invention is to enable a self-excited synchronous A. C. machine of the character above described when operating as a motor from a D. C. supply to exert substantially the optimum value of torque for a given direct current.

The invention consists in providing, in a self-excited machine of the character above described, an additional winding on the field system electrically in space quadrature with the main shunt field winding and permanently connected in series with the D. C. armature winding so as magnetically to oppose the armature reaction when the D. C. brushgear is in the neutral position.

The additional winding on the field system is provided to enable the machine to exert the optimum value of torque when it is used as a motor for starting purposes. The additional winding is strictly a compensating winding and not a series field winding, and as such is left permanently in circuit, thus avoiding additional D. C. terminals and ensuring the maximum simplicity of the external connections. The shunt winding is preferably connected to the main D. C. terminals rather than in parallel with the D. C. armature winding only.

Figure 1:
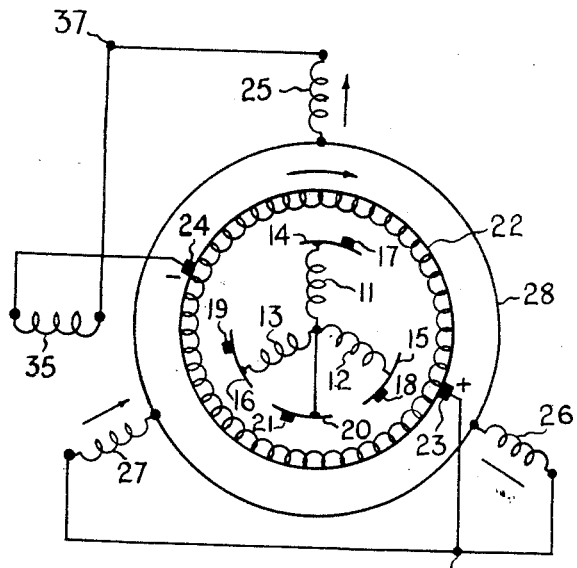
Figure 2:
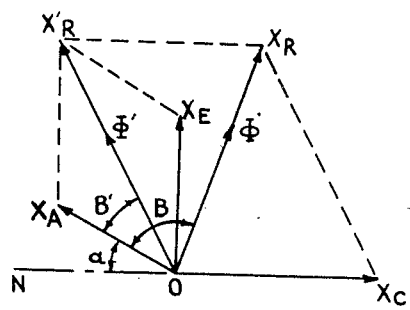

The function of the additional winding will now be described with reference to the accompanying drawings, in which Fig. 1 shows the connections of the machine and the location of the additional winding, and Fig. 2 is a vector diagram illustrating the function of the winding.

In Fig. 1, 11, 12 and 13 represent the phases of the A. C. armature winding, their outlet ends being connected to slip rings 14, 15 and 16 respectively and their inner ends to slip ring 20; brushes 17, 18, 19 and 21 engage with slip rings 14, 15, 16 and 20 respectively, brushes 17, 18 and 19 constituting the line terminals and brush 21 the neutral terminal of the machine; 22 represents the D. C. armature winding and its associated commutator with which brushes 23 and 24 engage.

Brush 23 is connected directly to D. C. terminal 36 and brush 24 is connected to one end of the additional field winding 35, the other end of which is connected to D. C. terminal 37.

When a distributed field winding is employed it may take the form of either a single-phase lap or concentric winding or a three-phase star or delta-connected winding having two of the three terminals connected together so as to form a short-circuited path at right angles to the exciting axis; in the figure a star-connected three-phase winding is shown with phases 25, 26 and 27, and 28 is the star point. The terminals of phases 26 and 27 are joined together and to D. C. terminal 36 whence the exciting current divides equally, half flowing inwardly in each phase. The halves reunite at 28 and flow outwardly in phase 25 to D. C. terminal 37. The exciting axis is thus vertical through phase 25 and the positive direction is upwards. The direction of rotation is shown clockwise and the brushes 23, 24 are shifted forward from the neutral axis which is at right angles to the exciting axis.

When it is required to start the prime mover which normally drives the machine as a generator, the D. C. terminals 36 and 37 are connected to a source of direct current, e. g. a battery. When the prime mover is running at normal speed, the battery may be recharged without reversal of the connections, except that it would be advisable to break one lead to the battery and insert a metal rectifier, and possibly, also a resistor, in order to limit the charging current, and prevent current reversal when the engine is shut down.

In Fig. 2 which is a space vector diagram, fixed relative to the field system, the magnitude and direction of the magneto-motive force (M. M. F.) of each winding is represented by a vector, and the directions coincide with those of the associated windings in Fig. 1. The line NOX$_c$ represents the axis of the D. C. armature winding 22 when the brushes 23 and 24 are set on neutral. As shown, however, the brushes are set off neutral in the direction of rotation by the angle α, and OX$_A$ represents the armature M. M. F. (armature reaction) when the winding is carrying a motoring current from the battery flowing into the winding by way of brush 23 and out by way of brush 24. The normal direction of flow of current for excitation is, of course, in the reverse direction. OX$_E$ represents the M. M. F. of the shunt, or main, field winding, electrically at right angles to ON.

If, firstly, the additional field winding is omitted OX'$_R$, the vector sum of OX$_A$ and OX$_E$, is the resultant M. M. F., and φ' is the magnetic flux making an angle β' with respect to OX$_A$. Since the torque exerted is proportional to the product of the armature ampere-turns, the flux and the sine of the angle β', it is evident that because B' is much less than 90° the torque exerted is considerably less than the optimum which would be realized were β' 90° or thereabouts.

The effect of introducing the additional winding in space phase opposition to the armature reaction with the brushes on neutral is represented by the vector OX$_C$. The addition of OX$_C$ to OX'$_R$ produces the resultant OX$_R$ and the corresponding flux φ at the much larger angle β from OX$_A$. Thus for the same values of current and flux the torque exerted is close to the optimum.

It will be evident also that by employing the additional winding as a compensating winding, in phase opposition to ON, rather than as a series field winding, in phase with OX$_E$, greater economy of copper is achieved for a given effect. This is because, due to the saturation of the armature core, the flux is not materially increased with any considerable increase in field ampere-turns. In addition, reversal of the winding is not necessary should the direction of rotation of the machine have to be changed, and thus the winding may be connected permanently in series with the armature with no additional terminals in consequence. For the reverse direction of running it is thus only necessary to interchange either the D. C. armature circuit leads or the shunt field leads to the D. C. terminals, preferably the former if the residual flux is to be reinforced by current from the battery when starting.

In the case of machines with a salient pole field system the additional winding is placed in slots in the pole faces just as is usually done with compensating windings in compensated D. C. machines. Otherwise the additional winding may share with the main field winding some of the slots in the field system.

What I claim as new and desire to secure by Letters Patent of the United States is:

1. A synchronous self-excited alternating current generator comprising a stationary field system, an armature rotatable in said field system, said armature having a main alternating current winding thereon, slip rings rotatable with said armature and connected to said main winding, a direct current commutated winding on said armature, a main exciting winding on said field system, a pair of stationary brushes connecting said commutated winding to said main exciting winding, the axis of said brushes being advanced in the direction of rotation of said armature beyond the neutral position, and an additional compensating winding on said field system, said additional compensating winding being positioned electrically in space quadrature with said main exciting winding and being connected permanently in circuit with said main exciting winding and said brushes magnetically to oppose the armature reaction when the pair of brushes is in the neutral position, whereby when said main exciting winding and said additional winding are connected in parallel to one another and to a source of D. C. supply, said generator acts as a motor and exerts substantially the optimum value of torque by reason of the presence of said additional winding.

2. A synchronous self-excited alternating current generator comprising a stationary field system, an armature rotatable in said field system, said armature having a main alternating current winding thereon, slip rings rotatable with said armature and connected to said main winding, a direct current commutated winding on said armature, a main exciting winding on said field system, a single pair of stationary brushes connecting said commutated winding to said main exciting winding, the axis of said brushes being advanced in the direction of rotation of said armature beyond the neutral position, and an additional compensating winding on said field system, said additional compensating winding being positioned electrically in space quadrature with said main exciting winding and having one terminal connected to one of said brushes and the other terminal to one terminal of said main exciting winding so as to be connected permanently in circuit with said main exciting winding and said brushes magnetically to oppose the armature reaction when the pair of brushes is in the neutral position, whereby when said main exciting winding and said additional winding are connected in parallel to one another and to a source of D. C. supply, said generator acts as a motor and exerts substantially the optimum value of torque by reason of the presence of said additional winding.

References Cited in the file of this patent

UNITED STATES PATENTS

| | | |
|---|---|---|
| 1,557,124 | Weichsel | Oct. 13, 1925 |
| 1,669,082 | Fynn | May 8, 1928 |
| 1,669,083 | Fynn | May 8, 1928 |
| 1,730,218 | Kostko | Oct. 1, 1929 |
| 1,747,198 | Weichsel | Feb. 18, 1930 |
| 2,579,579 | Hoover | Dec. 25, 1951 |